(12) United States Patent
Heath et al.

(10) Patent No.: US 8,762,884 B2
(45) Date of Patent: Jun. 24, 2014

(54) SYSTEM AND METHOD FOR PERSONALIZED FAST NAVIGATION

(75) Inventors: Chester Heath, Boca Raton, FL (US); Pedro Martinez, Boca Raton, FL (US)

(73) Assignee: The Quantum Group, Inc., Lake Worth, FL (US)

( * ) Notice: Subject to any disclaimer, the term of this patent is extended or adjusted under 35 U.S.C. 154(b) by 321 days.

(21) Appl. No.: 12/506,659

(22) Filed: Jul. 21, 2009

(65) Prior Publication Data

US 2010/0180231 A1   Jul. 15, 2010

Related U.S. Application Data

(60) Provisional application No. 61/083,017, filed on Jul. 23, 2008.

(51) Int. Cl.
 *G06F 3/048* (2013.01)
(52) U.S. Cl.
 USPC ........... 715/811; 715/747; 715/789; 715/745; 715/810; 715/733
(58) Field of Classification Search
 USPC .................................................. 715/750, 811
 See application file for complete search history.

(56) References Cited

U.S. PATENT DOCUMENTS

| | | | | |
|---|---|---|---|---|
| 5,220,657 A * | 6/1993 | Bly et al. | | 711/152 |
| 5,564,004 A * | 10/1996 | Grossman et al. | | 715/835 |
| 5,694,563 A * | 12/1997 | Belfiore et al. | | 715/821 |
| 6,002,403 A * | 12/1999 | Sugiyama et al. | | 715/717 |
| 6,262,726 B1 * | 7/2001 | Stedman et al. | | 715/745 |
| 6,377,286 B1 * | 4/2002 | Hochmuth | | 715/810 |
| 6,426,761 B1 * | 7/2002 | Kanevsky et al. | | 715/788 |
| 6,684,264 B1 * | 1/2004 | Choi | | 710/15 |
| 6,806,892 B1 * | 10/2004 | Plow et al. | | 715/781 |
| 7,620,894 B1 * | 11/2009 | Kahn | | 715/707 |
| 2002/0004744 A1 * | 1/2002 | Muyres et al. | | 705/14 |
| 2002/0122066 A1 * | 9/2002 | Bates et al. | | 345/786 |
| 2003/0018714 A1 * | 1/2003 | Mikhailov et al. | | 709/203 |
| 2003/0117440 A1 * | 6/2003 | Hellyar et al. | | 345/767 |
| 2003/0225730 A1 * | 12/2003 | Warner et al. | | 707/1 |
| 2004/0135812 A1 * | 7/2004 | Tai et al. | | 345/779 |
| 2004/0216058 A1 * | 10/2004 | Chavers et al. | | 715/810 |
| 2005/0097506 A1 * | 5/2005 | Heumesser | | 717/102 |
| 2006/0123353 A1 * | 6/2006 | Matthews et al. | | 715/779 |
| 2006/0168101 A1 * | 7/2006 | Mikhailov et al. | | 709/217 |
| 2007/0204037 A1 * | 8/2007 | Kunz et al. | | 709/225 |
| 2007/0245407 A1 * | 10/2007 | Lester et al. | | 726/5 |

(Continued)

*Primary Examiner* — Tuyetlien Tran
*Assistant Examiner* — Abimbola Ayeni
(74) *Attorney, Agent, or Firm* — Novak Druce Connolly Bove + Quigg LLP (57) ABSTRACT

A system for personalized navigation of computer screens. The system can comprise one or more electronic data processors. The system can also include a module configured to execute on the more or more electronic data processors, where the module can be configured to display a plurality of icons retained in a file associated with a particular user on a computer screen. The icons can comprise one or more assigned icons from an assigned icons list and candidate icons from a candidate icons list, where both the assigned and candidate icons are derived from a pool of icons. Also, the module can be configured to assign an icon to a currently displayed screen by utilizing a selection tool and placing the icon in the assigned icons list, where the icon is selected from the candidate icons list. The module can be further configured to return to the assigned screen when the assigned icon is selected.

21 Claims, 8 Drawing Sheets

(56) References Cited

U.S. PATENT DOCUMENTS

2007/0288860 A1* 12/2007 Ording et al. ............... 715/779
2008/0082262 A1* 4/2008 Silva et al. .................. 701/211
2008/0168367 A1* 7/2008 Chaudhri et al. ............ 715/764
2009/0199122 A1* 8/2009 Deutsch et al. .............. 715/771
2009/0199133 A1* 8/2009 Deutsch et al. .............. 715/811

* cited by examiner

SYSTEM AND METHOD FOR PERSONALIZED FAST NAVIGATION

CROSS-REFERENCE TO RELATED APPLICATIONS

This application claims the benefit of U.S. Provisional Patent Application No. 61/083,017, which was filed Jul. 23, 2008, and which is incorporated herein in its entirety.

FIELD OF THE INVENTION

The present invention is related to the fields of computer system navigation, and more particularly, to personalized navigation techniques to increase worker productivity.

BACKGROUND OF THE INVENTION

Technology has played a pivotal role in simplifying many tasks, solving problems, decreasing operating costs, and shaping how work is done today. Despite the many problems that have already been solved through the use of technology, optimizing worker productivity still remains a goal that continues to need significant focus and attention. Workers in medical and other data entry types of situations often develop a pattern of work where a limited set of preferred screens are typically selected from a group of many screens on their computing devices. Navigating through the various screens involves going through multiple and, often times, confusing steps to arrive at the desired screen.

Having to go through multiple, often tedious, and sometimes confusing steps lends itself to frustrated employees, decreased worker productivity, wasted time, and increased costs. In order to more effectively increase worker productivity, one must do so by reducing the amount of steps, menus, time, and other hurdles the worker has to go through to get to a desired screen. When a worker can access screens with relative ease and fewer steps, the worker can devote the saved time to other important tasks. As a result, there is a need for a more effective, efficient, and intuitive means of navigation so as to increase worker productivity.

SUMMARY OF THE INVENTION

The present invention is directed to systems and methods for personalized navigation of computer screens within a computer system. The invention simplifies navigation by reducing the number of steps required to access a particular screen, thereby increasing worker productivity.

One embodiment of the invention is a system for personalized navigation of computer screens. The system can comprise one or more electronic data processors. The system can also include a module configured to execute on the more or more electronic data processors, where the module can be configured to display a plurality of icons retained in a file associated with a particular user on a computer screen. The icons can comprise one or more assigned icons from an assigned icons list and candidate icons from a candidate icons list, where both the assigned and candidate icons are derived from a pool of icons. Also, the module can be configured to assign an icon to a currently displayed screen by utilizing a selection tool and placing the icon in the assigned icons list, where the icon is selected from the candidate icons list. The module can be further configured to return to the assigned screen when the assigned icon is selected.

Another embodiment of the invention is a computer-based method for personalized navigation of computer screens within a computer system. The method can include displaying a plurality of icons retained in a file associated with a particular user on a computer screen, wherein the icons comprise one or more assigned icons from an assigned icons list and candidate icons from a candidate icons list, which, in turn, are derived from a pool of icons. The method can also include assigning an icon to a currently displayed screen utilizing a selection tool and placing the icon in the assigned icons list, where the icon is selected from the candidate icons list. Furthermore, the method can include returning to the assigned screen when the assigned icon is selected.

Yet another embodiment of the invention is a computer-readable storage medium that contains computer-readable code that when loaded on a computer causes the computer to perform the following steps: displaying a plurality of icons retained in a file associated with a particular user on a computer screen, where the icons comprise one or more assigned icons from an assigned icons list and candidate icons from a candidate icons list, which are derived from a pool of icons; assigning an icon to a currently displayed screen utilizing a selection tool and placing the icon in the assigned icons list, where the icon is selected from the candidate icons list; and returning to the assigned screen when the assigned icon is selected.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
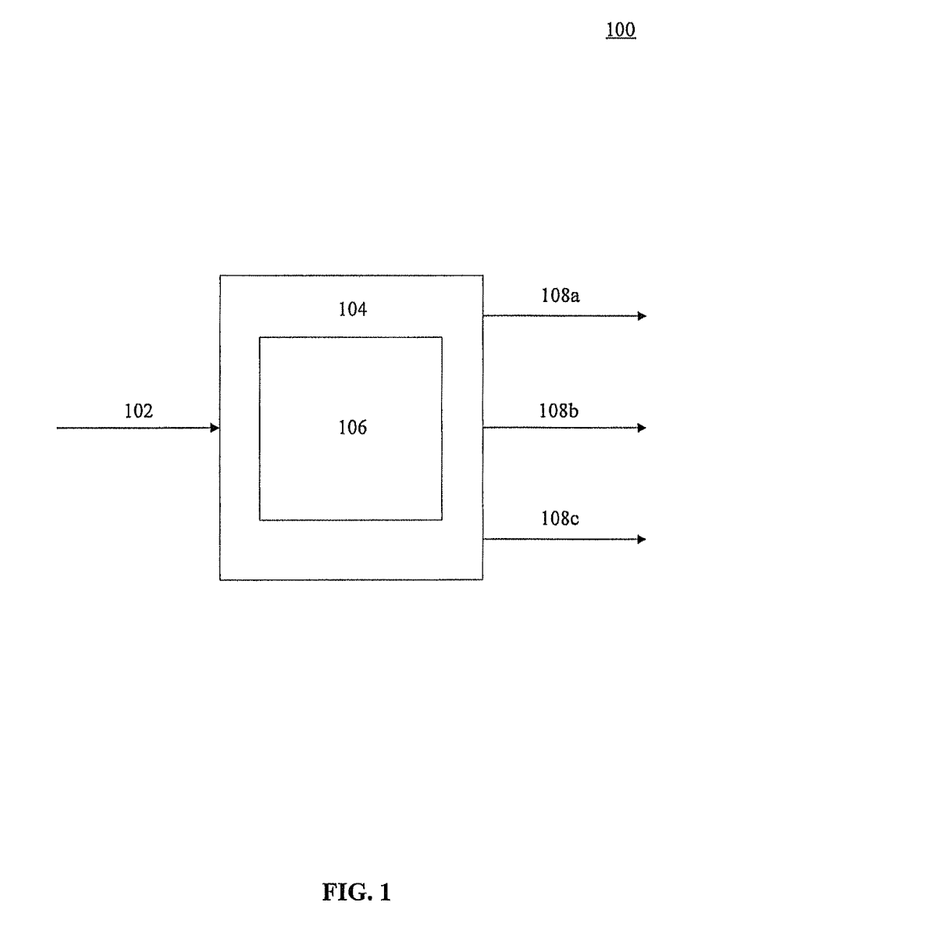
FIG. 1 is a schematic view of a system for personalized navigation of computer screens, according to one embodiment of the invention.

Referring initially to FIG. 1, a system 100 for personalized navigation of computer screens, according to one embodiment of the invention, is schematically illustrated. The system can include one or more inputs 102 and one or more outputs 108a-c. The one or more inputs 102 can be generated from a computer mouse, touch screen device, or other input device. The one or more outputs 108a-c can include displaying icons, assigning icons, or returning a user to a particular screen. The system 100 also can include one or more electronic data processors 104. Although one input 102 and three outputs 108a-c are shown, it will be apparent to one of ordinary skill based on the description that a greater number of inputs and a greater or lesser number of outputs can be utilized. The system 100 also can include a module 106, which, can be implemented as computer-readable code configured to execute on the one or more electronic data processors 104.

Alternatively, the module 106 can be implemented in hardwired, dedicated circuitry for performing the operative functions described herein. In yet another embodiment, however, the module 106 can be implemented in a combination of hardwired circuitry and computer-readable code.

Operatively, the module 106 displays a plurality of icons retained in a file associated with a particular user on a computer screen, where the icons comprise one or more assigned icons from an assigned icons list and candidate icons from a candidate icons list. Both the assigned and candidate icons are derived from a pool of icons.

Figure 2:
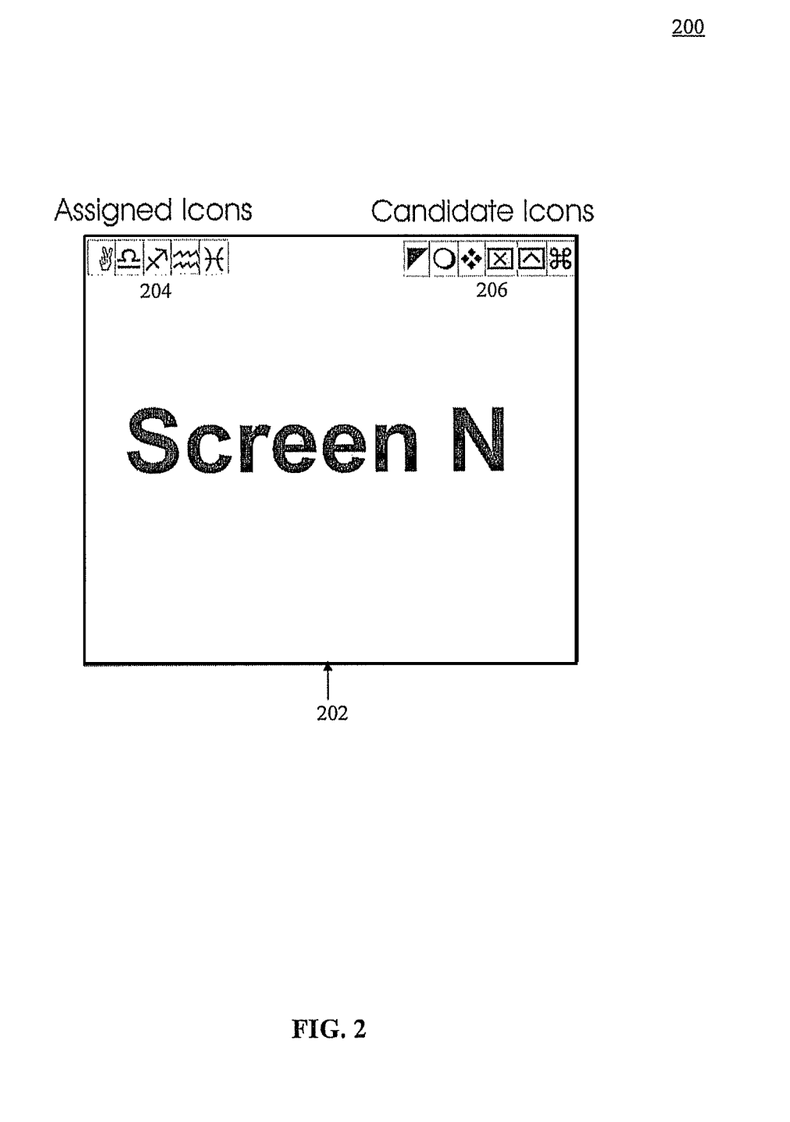
FIG. 2 is a view of a computer display and screen including assigned icons and candidate icons.
Figure 3:
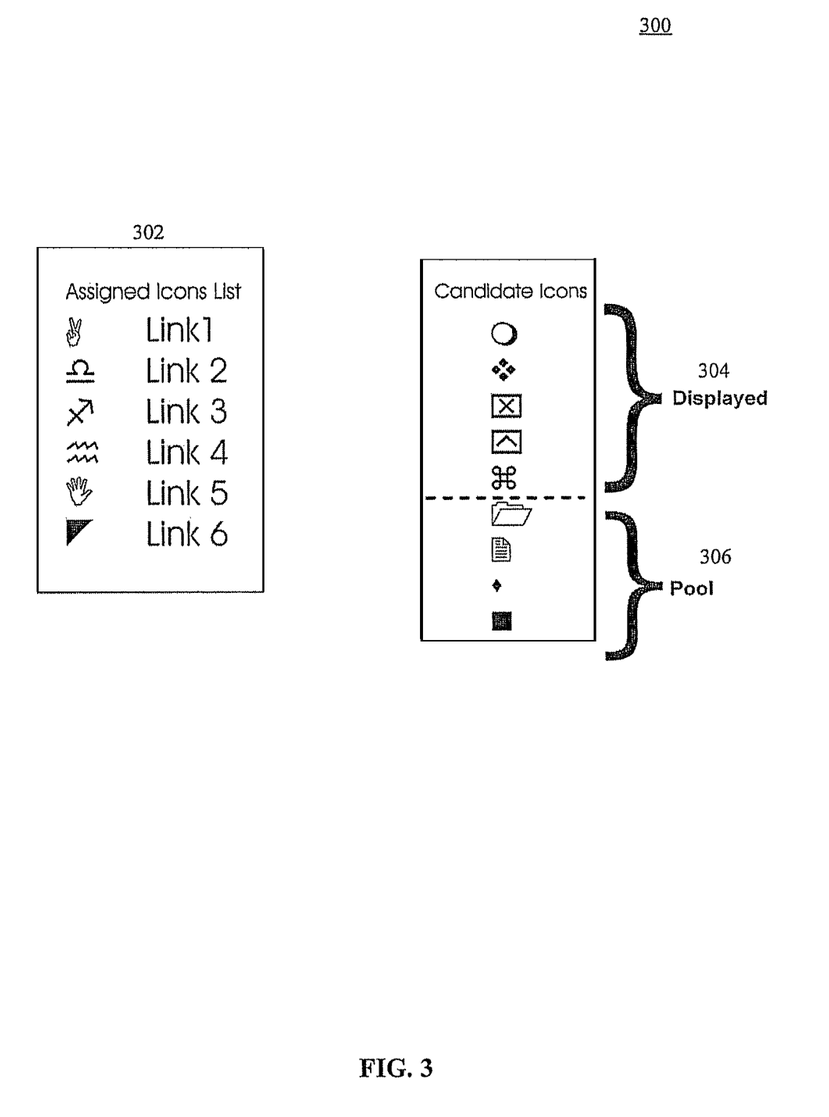
FIG. 3 is a view of a screen featuring assigned icon and candidate icon lists.

Referring now also to FIG. 2, an example of a computer display 200 powered by the module 106 is illustrated. The computer display 200 can display a particular screen N 202, while also displaying assigned icons 204 and candidate icons 206. The particular screen N 202 can be associated with one of the assigned icons 204. Referring additionally to FIG. 3, a screen 300 featuring an assigned icon list 302 and a candidate icon list 304 is provided. Assigned screens and links have corresponding assigned icons with the assigned icon list 302. The screen 300 can display both the assigned icon list 302 and the candidate icon list 304, which are derived from a pool of icons 306. The pool of icons 306 are not displayed.

Figure 4:
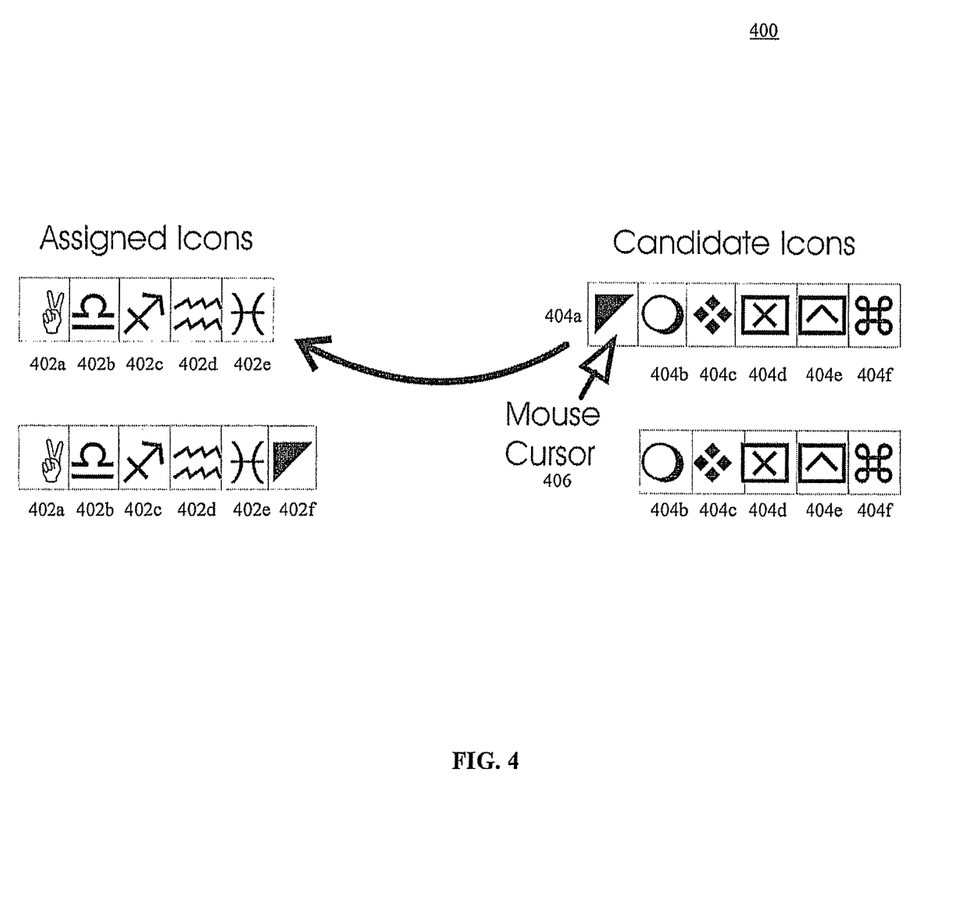
FIG. 4 is an illustration depicting the assignment of icons to the assigned icons list from the candidate icons list.

Additionally, the module 106 assigns an icon to a currently displayed screen utilizing a selection tool and placing the icon in the assigned icons list, where the icon is selected from the candidate icons list. The selection tool can comprise a computer mouse, a touch screen device, keyboard or other input device. Referring now also to FIG. 4, an illustration of a screen 400 depicting the assignment of icons to an assigned icons list from a candidate icons list is provided. The screen 400 includes assigned icons 402a-f, candidate icons 404a-f, and a selection tool 406, which in this case is a mouse cursor. A user utilizing the selection tool 406, assigns one of the candidate icons 404a to a currently displayed screen. This operation causes the chosen candidate icon 404a to become one of the assigned icons 402f.

Figure 5:
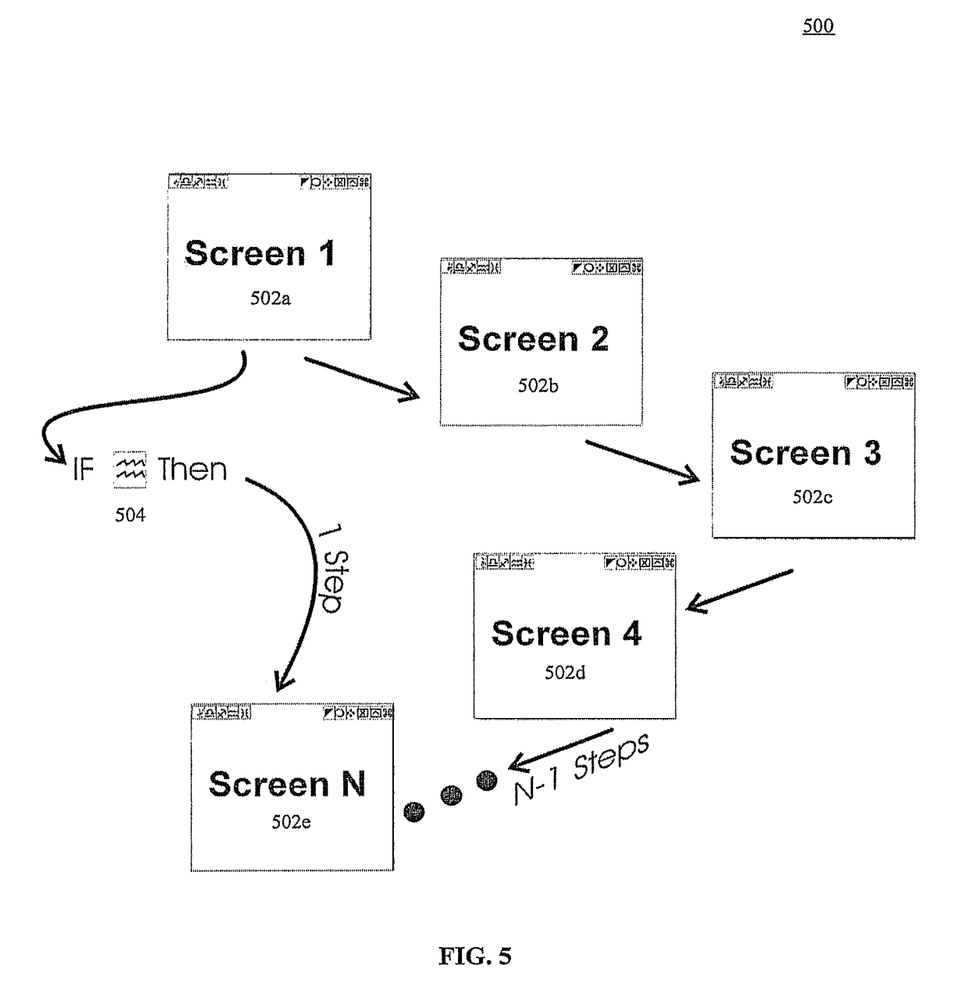
FIG. 5 is a flowchart that illustrates a reduction of steps needed to view a particular screen using the system as compared to a traditional process, according to an embodiment of the invention.

Furthermore, the module 106 returns to the assigned screen when the assigned icon is selected. Referring now also to FIG. 5, a flowchart is provided that illustrates a reduction in steps needed to view a particular screen using a system 500 as compared to a traditional process. The system 500 includes sequential screens 502a-e and an assigned icon 504, which is assigned to screen 502e. A user utilizing a traditional process to arrive at a particular screen will most likely have to go through N−1 steps to arrive at the desired screen. In the flowchart provided, the user would have to go through 5−1 or 4 steps to get to screen 502e, the fifth screen using a traditional process. However, if the user assigns the fifth screen 502e to a particular icon 504 and the user selects the icon 504, then the user can directly jump to screen 502e in a single step instead of in four steps.

According to a particular embodiment, the module 106 can be configured to assign an icon to a log on or sign on process for a particular user of the system. For example, an administrator of a computer system could assign a particular icon to a given user for logging on to the system. When a user clicks on the assigned icon the user is logged on to the system in a single step.

Figure 6:
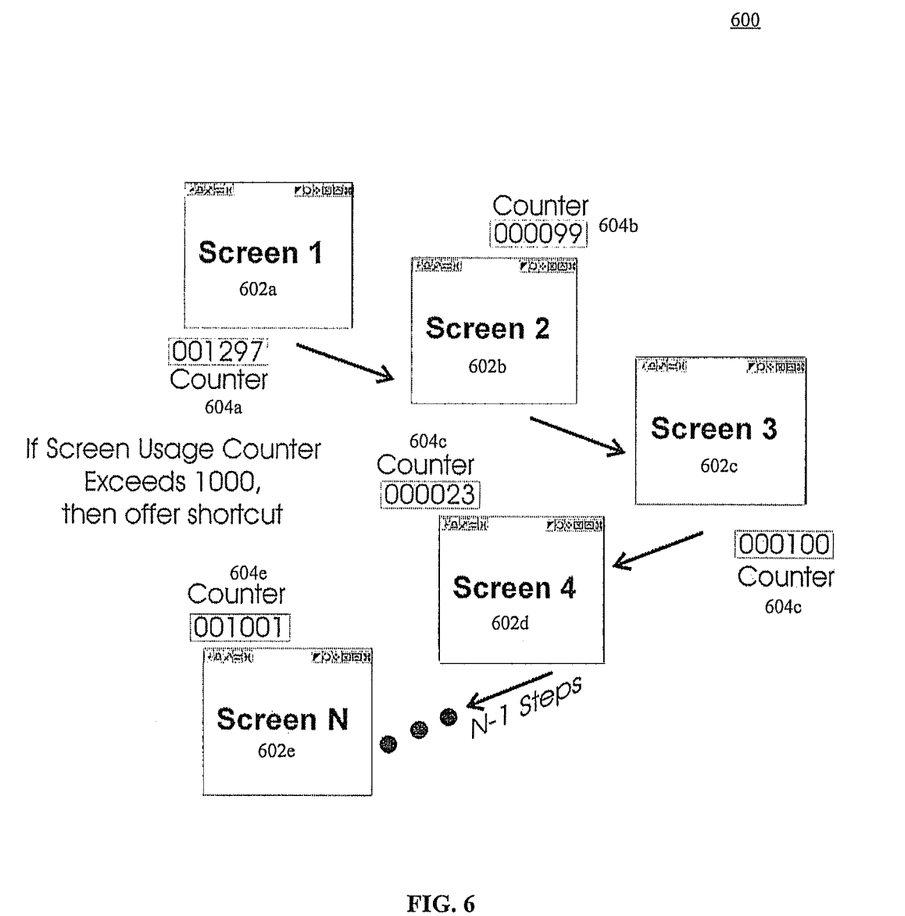
FIG. 6 is an illustration depicting use of counters by the system, according to an embodiment of the invention.

In another embodiment, the module 106 can be configured to identify frequently visited screens using counters, wherein each screen has a counter, which is incremented each time a user visits the particular screen. The counter for each screen can be reset by the user. The module 106 can be further configured to notify a user when a counter for a particular screen reaches a user-defined threshold. Referring now also to FIG. 6, an illustration depicting the use of counters by a system 600 is provided. The system 600 can include screens 602a-e and corresponding counters 604a-e. Each time a user visits screen 602a, for example, the corresponding counter 604a is incremented by one. Also, the system 600 can notify the user when a counter for a particular screen 602a-e reaches a user-defined threshold, which in this case happens to be 1000. The system 600 can cause a list of candidate icons to blink, change color, or otherwise emphasize itself to the user, so that the user may assign one of the candidate icons to the screen passing the threshold. The thresholds for the counters can be changed to decrease or increase the number of preferred screens 602a-e that the system 600 may suggest to the user.

According to one embodiment, the module 106 can be configured modify the functions of a particular icon when the icon is selected, wherein the functions are selected from at least one among returning a displayed icon to the pool of icons, replacing the displayed icon with a new icon, elevating or reducing the functionality of an icon, and including the icon in a defined sequence of functions. For example, if a user does not like a particular icon in the currently displayed candidate list the user can return the icon to the pool of icons and have a new icon take the place of the previous icon in the candidate list. The user can have the option of deleting the icon, undoing the last icon, showing the candidate icon library, elevating the status of the icon, associating the icon with a previous icon, assigning the icon as a next icon in a sequence of icons, changing the color of the icon, assigning the icon to a user sign-on process, entering text for highlighting, and creating reminder icons for notifying the user of important events.

Figure 7:
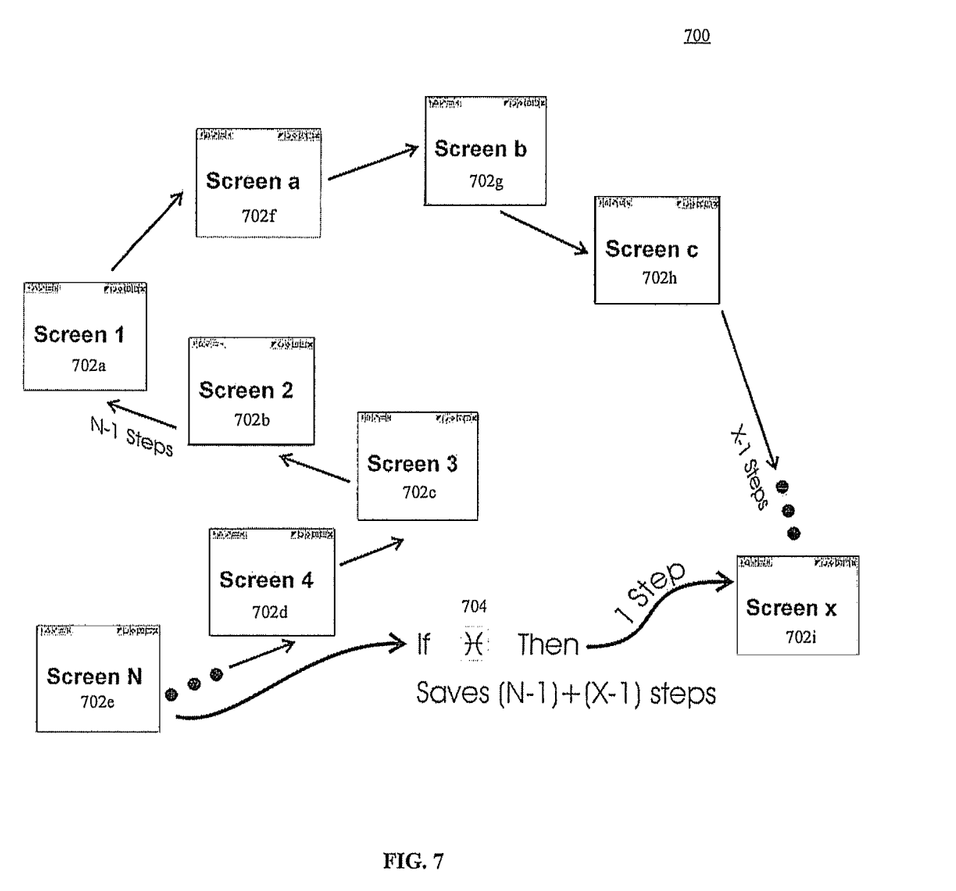
FIG. 7 is an illustration of moving directly from one screen to another in the system.

The module 106 can be further configured to move directly from one screen to an assigned screen when the corresponding assigned icon is selected. Referring now also to FIG. 7, an illustration of a system 700 enabling a user to move directly from one screen to another is provided. The system 700 can include screens 702a-e, which represent screens 1 through N, and screens 704f-i, which represent screens a through x. The system 700 also can include an icon 704, which can be assigned to screen 702i. If a user wants to move from screen N 702e to screen x 702i, the user typically would have to traverse back to screen 1 702a, which takes N−1 steps. Then, the user could possibly have to go through x−1 steps to reach screen x 702i. This leaves the user having to go through (N−1)+(x−1) steps plus a decision step. However, if the icon 704 is assigned to screen x 702i, the user can move directly from screen N 702e to screen x 702i by selecting the icon 704.

In another embodiment, the module 106 can be configured to utilize a super icon, wherein the super icon is used to select a new set of preferred icons to be displayed in the assigned icons list. The module 106 can be further configured to utilize a next icon, wherein the next icon is selected by a user to step through sequential screens. For example, if a physician is using a computing device while examining a patient, the physician can select the patient's history and previous lab tests from a list of standard icons on his computing device. However, if the physician wanted to be able to view a new set of icons he could simply click a super icon, which would select a new sequence of preferred icons to be displayed in the list of assigned icons. The physician would step through the sequential screens by selecting the next icon. No more than one selection would be required to move from one step in the process to another. The patient could then go to checkout, where a clerk could select meaningful icons and utilize a super icon to see another set of preferred icons related to processes the clerk typically uses.

Figure 8:
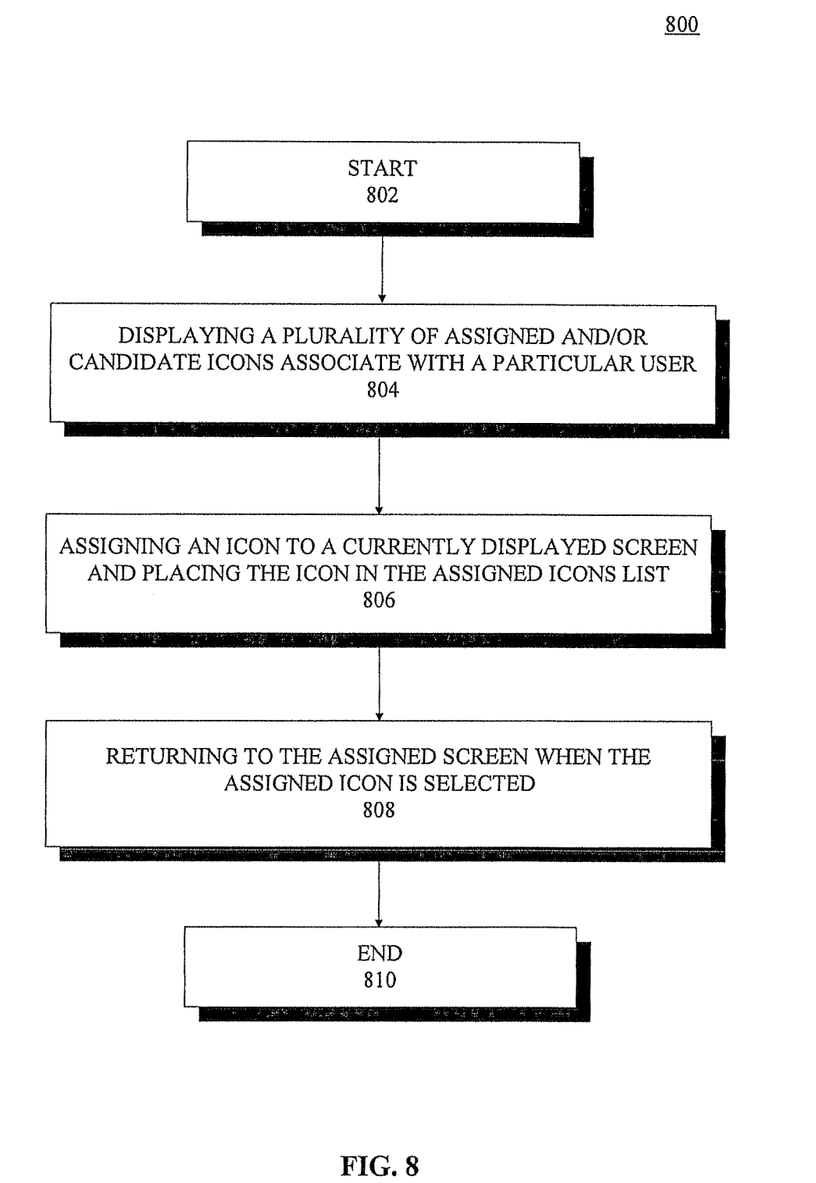
FIG. 8 is a flowchart of steps in a method for personalized navigation of computer screens within a computer system, according to another embodiment of the invention.

Referring now to FIG. 8, a flowchart is provided that illustrates certain method aspects of the invention. The flowchart depicts steps of a method 800 for personalized navigation of computer screens within a computer system. The method 800 illustratively can include, after the start step 802, displaying a plurality of icons retained in a file associated with a particular user on a computer screen, where the icons comprise one or more assigned icons from an assigned icons list and candidate icons from a candidate icons list at step 804. Both the assigned and candidate icons are derived from a pool of icons. The method 800 also can includes assigning an icon to a currently displayed screen utilizing a selection tool and placing the icon in the assigned icons list, where the icon is selected from the candidate icons list at step 806. Furthermore, the method 800 can include, at step 808, returning to the assigned screen when the assigned icon is selected. The method 800 illustratively concludes at step 810.

According to another embodiment, the method 800 can include, at the assigning step 806, assigning an icon to a log on or sign on process for a particular user of the system. The method 800 can also include identifying frequently visited screens with counters, wherein each screen has a counter which is incremented each time a user visits the particular screen and which can be reset by the user. Furthermore, the method 800 can further include notifying a user when a counter for a particular screen reaches a user-defined threshold.

In one embodiment, the method 800 can include modifying the functions of a particular icon when the icon is selected, wherein the functions are selected from at least one among returning a displayed icon to the pool of icons, replacing the displayed icon with a new icon, elevating or reducing the functionality of an icon, and including the icon in a defined sequence of functions. The method 800 can further include moving directly from one screen to an assigned screen when the corresponding assigned icon is selected. In another embodiment, the method 800 can include utilizing a super icon, wherein the super icon is used to select a new set of preferred icons to be displayed in the assigned icons list. The method can further include utilizing a next icon, wherein the next icon is selected by a user to step through sequential screens.

The invention, as already mentioned, can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. A computer-based method for personalized navigation of a plurality of computer screens within a computer system, the method comprising:

receiving a selection of at least one of the plurality of computer screens;

responsive to the selection, singly presenting the at least one of the plurality of computer screens on a display device of the computer system;

throughout the presenting of any of the plurality of computer screens, concurrently and persistently displaying a plurality of icons on the display device to yield displayed icons, retained in a file associated with a particular user, wherein the displayed icons comprise at least one assigned icon defining an assigned icons list and at least one candidate icon defining a candidate icons list, wherein both the at least one assigned icon and the at least one candidate icon are derived from a pool of icons, wherein each one of the at least one assigned icon is associated with a different one of the plurality of computer screens and is operable to cause the computer system to present, on the display device, one of the plurality of computer screens associated with the one of the at least one assigned icon when the one of the at least one assigned icon is selected, and wherein each one of the at least one candidate icon is operatively associated with none of the plurality of computer screens and causes no action to be performed when selected; and assigning a selected icon from the candidate icons list to the one of the plurality of screens currently displayed on the display device utilizing a selection tool to yield an assigned screen for the selected icon, wherein the assigning causes the selected icon to be transferred to the assigned icons list, and wherein the assigning associates the selected icon with the assigned screen and makes the selected icon operable to cause the computer system to present the assigned screen on the display device when the selected icon is subsequently selected from the assigned icons list.

2. The method of claim 1, wherein the assigning step comprises assigning an icon to a log on or sign on process for a particular user of the system.

3. The method of claim 1, wherein each particular screen of the plurality of screens has a counter which is incremented each time a user visits the particular screen and which can be reset by the user, and wherein the method further comprises:

responsive to the counter for a particular screen from the plurality of screens reaching a counter threshold, notifying the user of reaching the counter threshold by altering an appearance of the at least one candidate icon when the particular screen is visited by the user.

4. The method of claim 1, further comprising modifying functions of a particular icon when the icon is selected, wherein the functions are selected from at least one among returning a displayed icon to the pool of icons, replacing the displayed icon with a new icon, elevating or reducing the functionality of an icon, or including the icon in a defined sequence of functions.

5. The method of claim 1, wherein the displayed icons further comprise a super icon, wherein a selection of the super icon causes a new set of preferred icons to be displayed in the assigned icons list.

6. The method of claim 1, wherein the displayed icons further comprise a next icon, wherein a selection of the next icon causes the computer system to step sequentially through the plurality of screens.

7. A computer-based system for personalized navigation of computer screens, the system comprising:
- at least one electronic data processor; and
- a module configured to execute on the at least one electronic data processor, wherein the module is configured to:
- receive a selection of at least one of the plurality of computer screens;
- singly present at least one of the plurality of computer screens on a display device of the computer system;
- throughout the presenting of any of the plurality of computer screens, concurrently and persistently display a plurality of icons to yield displayed icons, retained in a file associated with a particular user, on a computer screen, wherein the displayed icons comprise at least one assigned icon defining an assigned icons list and at least one candidate icon defining a candidate icons list, wherein both the at least one assigned icon and the at least one candidate icon are derived from a pool of icons, wherein each one of the at least one assigned icon is operatively associated to a different one of the plurality of computer screens and is operable to cause the computer system to present, on the display device, one of the plurality of computer screens associated with the one of the at least one assigned icon when the one of the at least one assigned icon is selected, and wherein the at least one candidate icon is operatively associated with none of the plurality of computer screens and causes no action to be performed when selected; and
- assign a selected icon from the candidate icons list to the one of the plurality of screens currently displayed on the display device utilizing a selection tool to yield an assigned screen for the selected icon,
- wherein the assigning causes the selected icon to be transferred to the assigned icon in the assigned icons list, and wherein the assigning of the selected icon associates the selected icon with the assigned screen and makes the selected icon operable to cause the computer system to present the assigned screen when the selected icon is subsequently selected from the assigned icons list.

8. The system of claim 7, wherein the module is configured to assign an icon to a log on or sign on process for a particular user of the system.

9. The system of claim 7, wherein each particular screen of the plurality of screens has a counter which is incremented each time a user visits the particular screen and which can be reset by the user, and wherein the module is further configured to:
- responsive to the counter for a particular screen from the plurality of screens reaching a counter threshold, notifying the user of reaching the counter threshold by altering an appearance of the at least one candidate icon when the particular screen is visited by the user.

10. The method of claim 7, wherein the module is configured to modify functions of a particular icon when the icon is selected, wherein the functions are selected from at least one among returning a displayed icon to the pool of icons, replacing the displayed icon with a new icon, elevating or reducing the functionality of an icon, or including the icon in a defined sequence of functions.

11. The system of claim 7, wherein the module is configured to display a super icon, wherein a user selection of the super icon causes a new set of preferred icons to be displayed in the assigned icons list.

12. The system of claim 7, wherein the module is configured to display a next icon, wherein a user selection of the next icon causes the computer system to step through sequential screens.

13. A non-transitory computer-readable storage medium having stored therein computer-readable instructions, which, when loaded in and executed by a computer causes the computer to perform the steps of:
- receiving a selection of at least one of the plurality of computer screens;
- singly presenting at least one of the plurality of computer screens on a display device of the computer system;
- throughout the presenting of any of the plurality of computer screens, concurrently and persistently displaying a plurality of icons on the display device to yield displayed icons, retained in a file associated with a particular user, wherein the displayed icons comprise at least one assigned icon defining an assigned icons list and at least one candidate icon defining a candidate icons list, wherein both the at least one assigned icon and the at least one candidate icon are derived from a pool of icons, wherein each one of the at least one assigned icon is associated with a different one of the plurality of computer screens and is operable to cause the computer system to present, on the display device, one of the plurality computer screens associated with the one of the at least one assigned icon when the one of the at least one assigned icon is selected, and wherein each one of the at least one candidate icon is operatively associated with none of the plurality of computer screens and causes no action to be performed when selected; and
- assigning a selected icon from the candidate icons list to the one of the plurality of screens currently displayed on the display device utilizing a selection tool to yield an assigned screen for the selected icon,
- wherein the assigning causes the selected icon to be transferred to the assigned icons list, and wherein the assigning associates the selected icon with the assigned screen and makes the selected icon operable to cause the computer system to present the assigned screen on the display device when the selected icon is subsequently selected from the assigned icons list.

14. The computer-readable storage medium of claim 13, wherein the assigning step comprises assigning an icon to a log on or sign on process for a particular user of the system.

15. The computer-readable storage medium of claim 13, wherein each particular screen of the plurality of screens has a counter which is incremented every time a user visits the particular screen and which can be reset by the user, further comprising computer-readable code for causing the computer to:
- responsive to the counter for a particular screen from the plurality of screens reaching a counter threshold, notifying the user of reaching the counter threshold by altering an appearance of the at least one candidate icon when the particular screen is visited by the user.

16. The method of claim 13, further comprising computer-readable code for causing the computer to modify functions of a particular icon when the icon is selected, wherein the functions are selected from at least one among returning a displayed icon to the pool of icons, replacing the displayed icon with a new icon, elevating or reducing the functionality of an icon, or including the icon in a defined sequence of functions.

17. The computer-readable storage medium of claim 13, further comprising computer-readable code for causing the computer to display a super icon, wherein a user selection of the super icon causes a new set of preferred icons to be displayed in the assigned icons list.

18. The computer-readable storage medium of claim 13, further comprising computer-readable code for causing the computer to display a next icon, wherein a user selection of the next icon causes the computer system to step sequentially through the plurality of screens.

19. The method of claim 3, wherein the altering comprises causing the at least one candidate icon to blink or to change color.

20. The system of claim 9, wherein the altering comprises causing the at least one candidate icon to blink or to change color.

21. The computer-readable storage medium of claim 15, wherein the altering comprises causing the at least one candidate icon to blink or to change color.

\* \* \* \* \*